US007289586B2

(12) United States Patent
Hui

(10) Patent No.: US 7,289,586 B2
(45) Date of Patent: Oct. 30, 2007

(54) SIGNAL PROCESSING APPARATUS AND METHOD

(75) Inventor: Siew Kok Hui, Singapore (SG)

(73) Assignee: Bitwave Pte Ltd., Singapore (SG)

( * ) Notice: Subject to any disclaimer, the term of this patent is extended or adjusted under 35 U.S.C. 154(b) by 0 days.

(21) Appl. No.: 11/293,183

(22) Filed: Dec. 5, 2005

(65) Prior Publication Data

US 2006/0072693 A1 Apr. 6, 2006

Related U.S. Application Data

(63) Continuation of application No. 09/831,346, filed as application No. PCT/SG99/00119 on Nov. 12, 1999, now Pat. No. 6,999,541.

(30) Foreign Application Priority Data

Nov. 13, 1998 (SG) .................................... 9804034

(51) Int. Cl.
*H04B 1/10* (2006.01)
*H04B 7/10* (2006.01)
*H04B 15/00* (2006.01)
*H04L 1/02* (2006.01)

(52) U.S. Cl. ...................... 375/349; 375/347; 375/350; 367/121; 381/94.7

(58) Field of Classification Search ................ 375/346, 375/347, 349, 350; 367/119, 121; 381/71.8, 381/71.11, 94.7

See application file for complete search history.

(56) References Cited

U.S. PATENT DOCUMENTS 4,025,721 A 5/1977 Graupe et al.
4,425,481 A 1/1984 Mansgold et al.
4,589,137 A 5/1986 Miller
4,628,529 A 12/1986 Borth et al.
4,630,304 A 12/1986 Borth et al.
4,630,305 A 12/1986 Borth et al.
4,887,299 A 12/1989 Cummins et al.
4,931,977 A 6/1990 Klemes (Continued)

FOREIGN PATENT DOCUMENTS

EP 0883325 12/1998

(Continued)

OTHER PUBLICATIONS

Griffiths et al., "An Alternative Approach to Linearly Constrained Adaptive Beamforming", IEEE Transactions on Antennas and Propagation, vol. AP-30, No. 1, Jan. 1982, pp. 27-34.

(Continued)

*Primary Examiner*—David B. Lugo
(74) *Attorney, Agent, or Firm*—Greenblum & Bernstein, P.L.C.

(57) ABSTRACT

A method of processing signals received from an array of sensors includes sampling and digitally converting the received signals. The digitally converted signals are processed to provide an output signal, the processing including filtering the signals using a first adaptive filter that enhances a target signal of the digitally converted signals and a second adaptive filter that suppresses an unwanted signal of the digitally converted signals, and processing the filtered signals in a frequency domain to further suppress the unwanted signal. The digitally converted signals are processed to determine a direction of arrival of the target signal, the processing including filtering the signals using a third adaptive filter.

16 Claims, 12 Drawing Sheets

U.S. PATENT DOCUMENTS

| | | | |
|---|---|---|---|
| 4,956,867 | A | 9/1990 | Zurek et al. |
| 5,027,410 | A | 6/1991 | Williamson et al. |
| 5,224,170 | A | 6/1993 | Waite, Jr. |
| 5,402,496 | A | 3/1995 | Soli et al. |
| 5,412,735 | A | 5/1995 | Engebretson et al. |
| 5,471,538 | A | 11/1995 | Sasaki et al. |
| 5,475,759 | A | 12/1995 | Engebretson |
| 5,557,682 | A | 9/1996 | Warner et al. |
| 5,568,519 | A | 10/1996 | Baier et al. |
| 5,610,991 | A | 3/1997 | Janse |
| 5,627,799 | A | 5/1997 | Hoshuyama |
| 5,680,467 | A | 10/1997 | Hansen |
| 5,694,474 | A | 12/1997 | Ngo et al. |
| 5,737,430 | A | 4/1998 | Widrow |
| 5,740,256 | A | 4/1998 | Castello Da Costa et al. |
| 5,754,665 | A | 5/1998 | Hosoi |
| 5,793,875 | A | 8/1998 | Lehr et al. |
| 5,825,898 | A | 10/1998 | Marash |
| 5,835,607 | A | 11/1998 | Martin et al. |
| 5,835,608 | A | 11/1998 | Warnaka et al. |
| 5,917,921 | A | 6/1999 | Sasaki et al. |
| 5,991,418 | A | 11/1999 | Kuo |
| 6,002,776 | A | 12/1999 | Bhadkamkar et al. |
| 6,049,607 | A | 4/2000 | Marash et al. |
| 6,069,963 | A | 5/2000 | Martin et al. |
| 6,072,884 | A | 6/2000 | Kates |
| 6,091,813 | A | 7/2000 | Harley et al. |
| 6,094,150 | A | 7/2000 | Ohnishi et al. |
| 6,097,771 | A | 8/2000 | Foschni |
| 6,127,973 | A | 10/2000 | Choi et al. |
| 2004/0193411 | A1 | 9/2004 | Hui et al. |

FOREIGN PATENT DOCUMENTS

| | | |
|---|---|---|
| WO | 00/30264 | 5/2000 |
| WO | 03/036614 | 5/2003 |

OTHER PUBLICATIONS

Ephraim et al., "Speech Enhancement Using Optimal Non-Linear Spectral Amplitude Estimation," Proc. IEEE International Conference Acoustics Speech and Signal Processing (Boston), 1983, pp. 1118-1121.

"Adaptive Antenna System", by Widrow et al., Proceedings of the IEEE, Dec. 1967, pp. 2143-2159.

Signal Cancellation Phenomena in Adaptive Antennas: B. Widrow et al., IEEE Transactions on Antennas and Propagation, vol. AP-30, No. 3, May 1982, , pp. 469-478.

"An Adaptive generalized Sidelobe Canceller with Derivative Constraints", by K. Buckley et al., IEEE Transactions on Antennas and Propagation, vol. AP-34, No. 3, Mar. 1986, pp. 311-319.

Fundamentals of Speech recognition, by Rabiner et al., "Fundamentals of Speech Recognition," Prentice Hall, 1993, pp. 77-79 and 183-190.

Y. Ephraim et al., IEEE Transactions on Acoustics, Speech and Signal Processing, vol. ASSP-32, No. 6, Dec. 1984, pp. 1109-1121.

Over-lap block processing of a signal using Hanning Window. The over-lap in this case is 50%.

SIGNAL PROCESSING APPARATUS AND METHOD

This is a continuation of U.S. application Ser. No. 09/831,346, filed May 11, 2001, now U.S. Pat. No. 6,999,541, which was the National Stage of International Application No. PCT/SG99/00119, filed Nov. 12, 1999, the contents of which are expressly incorporated by reference herein in their entireties. The International Application was published under PCT Article 21(2) as WO 00/30264 on May 25, 2000 in English.

BACKGROUND AND FIELD OF THE INVENTION

This invention relates to a method of signal processing and apparatus therefor.

In many situations, observations are made of the output of a multiple input and multiple output system such as phase array radar system, sonar array system or microphone array system, from which it is desired to recover the wanted signal alone with all the unwanted signals, including noise, cancelled or suppressed. For example, in a microphone array system for a speech recognition application, the objective is to enhance the target speech signal in the presence of background noise and competing speakers.

The most widely used approach to noise or interference cancellation in a multiple channel case was suggested by Widrow etc in "Adaptive Antenna Systems" Proc. IEEE, Vol. 55 No. 12, December 1967 and "Signal Cancellation Phenomena in Antennas: causes and cures", IEEE Trans. Antennas Propag., Vol. AP30, May 1982. Also by L. J. Griffiths etc in "An Alternative Approach to Linearly Constrained Adaptive Beamforming". IEEE Trans. Antennas Propag. VolAP30, 1982. In these and other similar approaches, the signal processing apparatus separates the observed signal into a primary channel which comprises both the target signal and the interference signal and noise, and a secondary channel which comprises interference signal and noise alone. The interference signals and noise in the primary channel are estimated using an adaptive filter having the secondary channel signal as input, the estimated interference and noise signal being subtracted from the primary channel to obtain the desired target signal.

There are two major drawbacks of the above approaches. The first is that it is assumed that the secondary channel comprises interference signals and noise only. This assumption may not be correct in practice due to leakage of wanted signals into the secondary channel due to hardware imperfections and limited array dimension. The second is that it is assumed that the interference signals and noise can be estimated accurately from the secondary channel. This assumption may also not be correct in practice because this will required a large number of degrees of freedom, this implying a very long filter and large array dimension. A very long filter leads to other problems such as rate of convergence and instability.

The first drawback will lead to signal cancellation. This degrades the performance of the apparatus. Depending on the input signal power, this degradation may be severe, leading to poor quality of the reconstructed speech because a portion of the desired signal is also cancelled by the filtering process. The second drawback will lead to poor interference and noise cancellation especially low frequency interference signals the wavelengths of which are many times the dimension of the array.

It is an object of the invention to provide an improved signal processing apparatus and method.

SUMMARY OF THE INVENTION

According to the invention in a first aspect, there is provided a method of processing signals received from an array of sensors comprising the steps of sampling and digitally converting the received signals and processing the digitally converted signals to provide an output signal, the processing including filtering the signals using a first adaptive filter arranged to enhance a target signal of the digitally converted signals and a second adaptive filter arranged to suppress an unwanted signal of the digitally converted signals and processing the filtered signals in the frequency domain to suppress the unwanted signal further.

Further preferred features of the invention are recited in appendant claims 2-40.

According to the invention in a second aspect, there is provided a method of calculating a spectrum from a coupled signal comprising the steps of:

1) deriving a target signal component S and an interference signal component I from the coupled signal;

2) transforming the target and interference signal components into respective frequency domain equivalents F(S) and F(I);and 3) constructing the spectrum P(S) and P(I) of at least one equivalent in accordance with:

$$P(S)=|\mathrm{Real}(F(S))|+|\mathrm{Imag}(F(S))|+G[F(S)]*R(s)$$

$$P(I)=|\mathrm{Real}(F(I))|+|\mathrm{Imag}(F(I))|+G[F(I)]*R(i)$$

where Real and Imag refer to taking the absolute value of the real or imaginary part of the frequency domain equivalent R(s), R(i) are scalar adjustment factors and G[F(S)] and G[F(I)] are functions of F(S) and F(I) respectively.

According to the invention in a third aspect, there is provided a method of calculating a reverberation coefficient from a plurality of signals received from respective sensors in respective signal channels of a sensor array comprising the steps of:

1) calculating a correlation time delay between signals from a reference one of the channels and another one of the channels using an adaptive filter;

2) performing adaptive filtering, using a second adaptive filter, on the received signals; and 3) calculating a reverberation coefficient from the filter coefficients of the first and second filters.

According to the invention in a fourth aspect, there is provided a method of signal processing of a signal having wanted and unwanted components comprising the steps of:

1) processing the signal in the time domain with at least one adaptive filter to enhance the wanted signal and/or reduce the unwanted signal, 2) transforming the thus processed signal to the frequency domain; and 3) performing at least one unwanted signal reduction process in the frequency domain.

The invention extends to apparatus for performing the method of the aformentioned aspects.

Each aspect of the invention is usable independently of the others, for example in other signal processing apparatus which need not include other features of this invention as described.

The described embodiment of the invention discloses a method and apparatus to enhance an observed target signal from a predetermined or known direction of arrival. The apparatus cancels and suppresses the unwanted signals and noise from their coupled observation by the apparatus. An approach is disclosed to enhance the target signal in a more realistic scenario where both the target signal and interference signal and noise are coupled in the observed signals. Further, no assumption is made regarding the number or the direction of arrival of the interference signals.

The described embodiment includes an array of sensors e.g. microphones each defining a corresponding signal channel, an array of receivers with preamplifiers, an array of analog to digital converters for digitally converting observed signals and a digital signal processor that processes the signals. From the observed signals, the apparatus outputs an enhanced target signal and reduces the noise and interference signals. The apparatus allows a tradeoff between interference and noise suppression level and signal quality. No assumptions are make about the number of interference signals and the characteristic of the noise.

The digital signal processor includes a first set of adaptive filters which act as a signal spatial filter using a first channel as a reference channel. This filter removes the target signal "s" from the coupled signal and puts the remaining elements of the coupled signal, namely interference signals "u" and system noise "q" in an interference plus noise channel referred to as a Difference Channel. This filter also enhances the target signal "s" and puts this in another channel, referred to as the Sum Channel. The Sum Channel consists of the enhanced target signal "s" and the interference signals "u" and noise "q".

The target signal "s" may not be removed completely from the Difference Channel due to the sudden movement of the target speaker or of an object within the vicinity of the speaker, so this channel may contain some residue target signal on occasions which can lead to some signal cancellation. However, the described embodiment greatly reduces this.

The signals from the Difference Channel are fed to a second adaptive filter set. This set of filters adaptively estimates the interference signals and noise in the Sum Channel.

The estimated signals are fed to an Interference Signal and Noise Cancellation and Suppression Processor which cancels and suppresses the noise and interference signals from the Sum Channel and outputs the enhanced target signal.

Updating of the parameters of the sets of adaptive filters is performed using, a further processor termed a Preliminary Signal Parameters Estimator which receives the observed signal and estimates the reverberation level of the signal, the system noise level, the signal level, estimate signal detection thresholds and the angle of arrival of the signal. This information is used by the decision processor to decide if any parameter update is required.

One application of the described embodiment of the invention is speech enhancement in a car environment where the direction of the target signal with respect to the system is known. Yet another application is speech input for speech recognition applications. Again the direction of arrival of the signal is known.

BRIEF DESCRIPTION OF THE DRAWINGS

An embodiment of the invention will now be described by way of example with reference to the accompanying drawings in which.

DETAILED DESCRIPTION OF THE EMBODIMENT OF THE INVENTION

Figure 1:
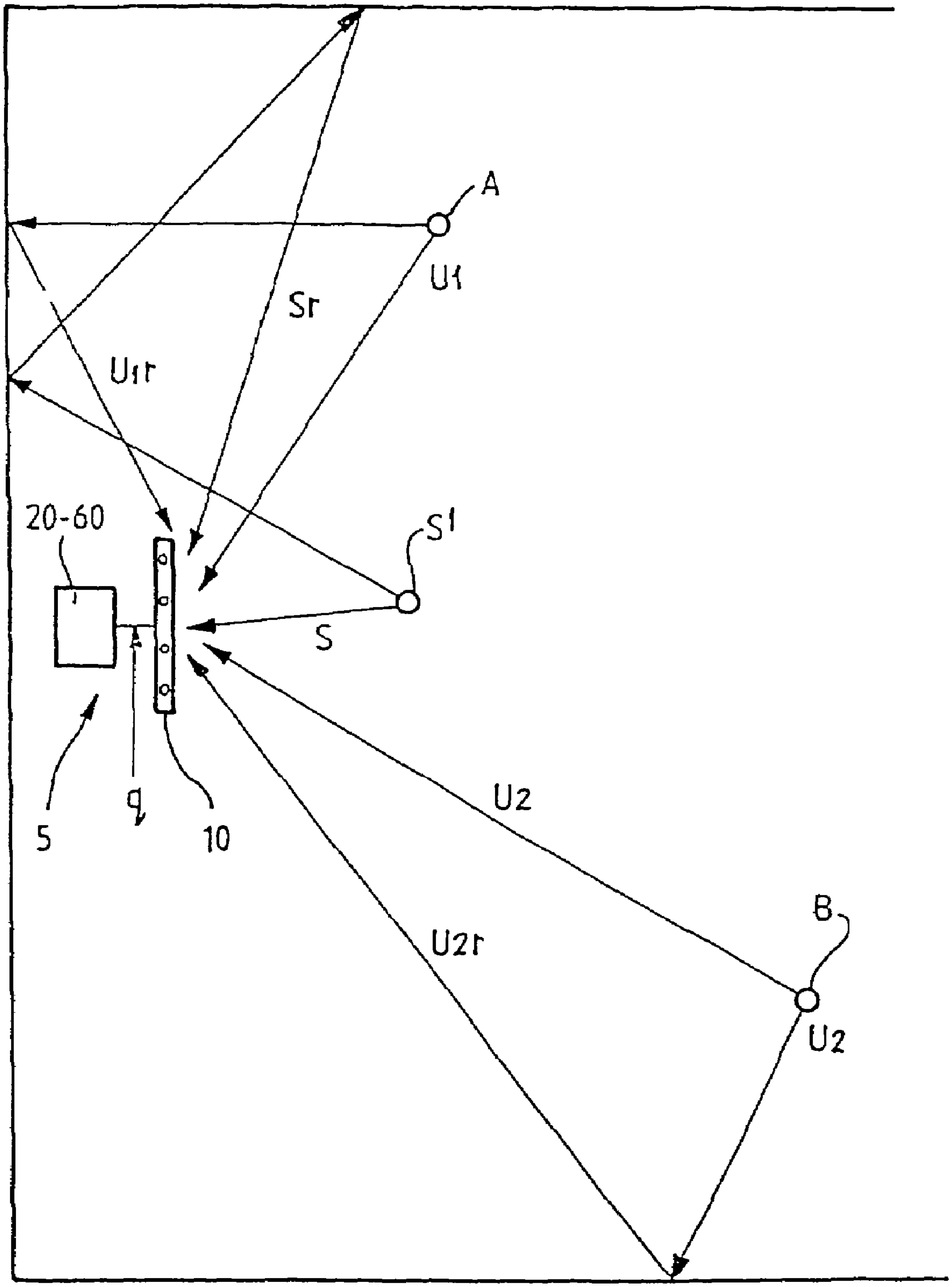
FIG. 1 illustrates a general scenario where the invention may be used.

FIG. 1 illustrates schematically the operating environment of a signal processing apparatus 5 of the described embodiment of the invention, shown in a simplified example of a room. A target sound signal "s" emitted from a source s' in a known direction impinging on a sensor array, such as a microphone array 10 of the apparatus 5, is coupled with other unwanted signals namely interference signals u1, u2 from other sources A,B, reflections of these signals u1*r*, u2*r* and the target signal's own reflected signal sr. These unwanted signals cause interference and degrade the quality of the target signal "s" as received by the sensor array. The actual number of unwanted signals depends on the number of sources and room geometry but only three reflected (echo) paths and three direct paths are illustrated for simplicity of explanation. The sensor array 10 is connected to processing circuitry 20-60 and there will be a noise input q associated with the circuitry which further degrades the target signal.

Figure 2:
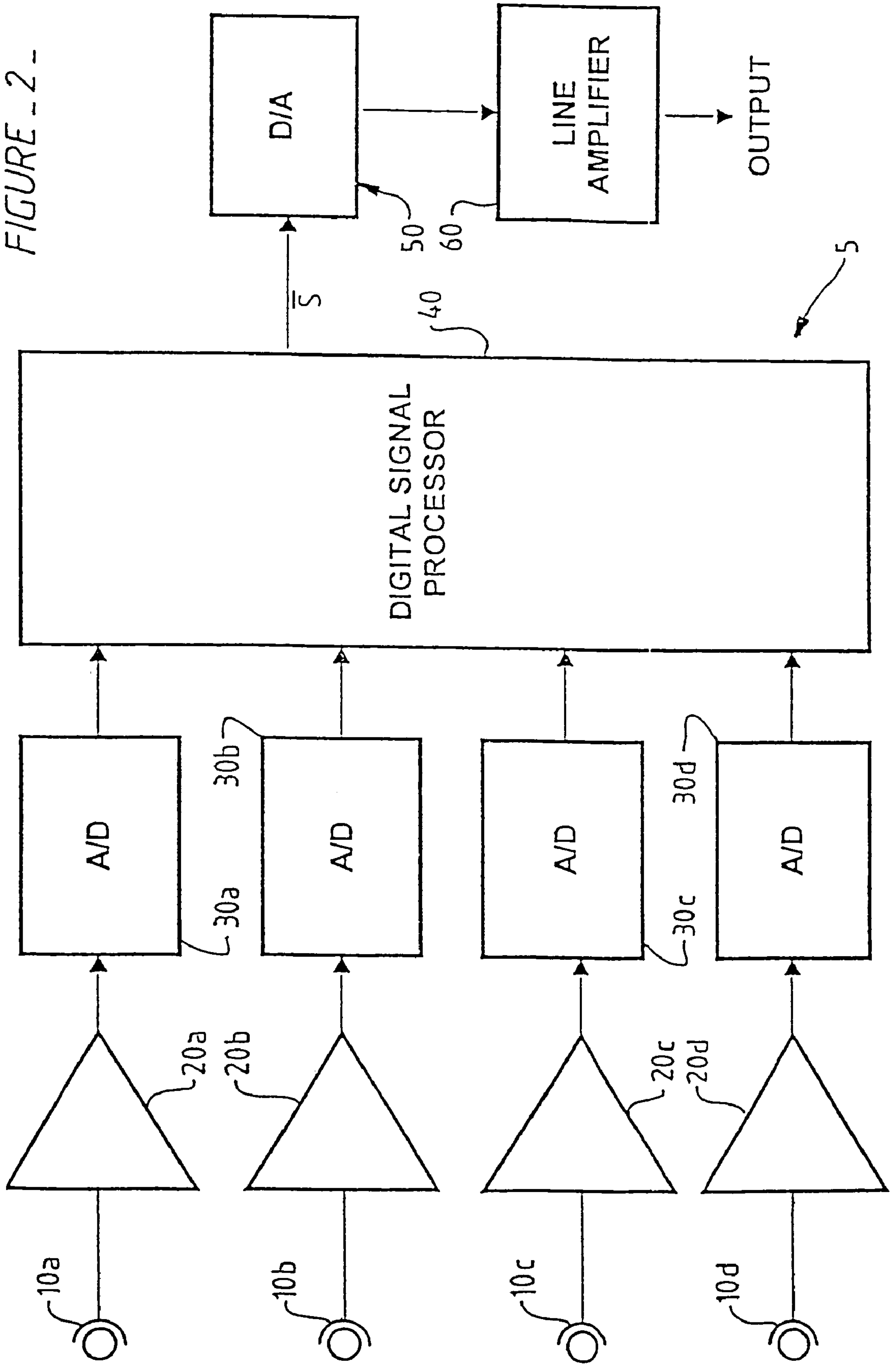
FIG. 2 is a schematic illustration of a general digital signal processing system embodying the present invention.

An embodiment of signal processing apparatus 5 is shown in FIG. 2. The apparatus observes the environment with an array of four sensors such as microphones 10*a*-10*d*. Target and noise/interference sound signals are coupled when impinging on each of the sensors. The signal received by each of the sensors is amplified by an amplifier 20*a-d* and converted to a digital bitstream using an analogue to digital converter 30*a-d*. The bit streams are feed in parallel to the digital signal processor 40 to be processed digitally. The processor provides an output signal to a digital to analogue converter 50 which is fed to a line amplifier 60 to provide the final analogue output.

Figure 3:
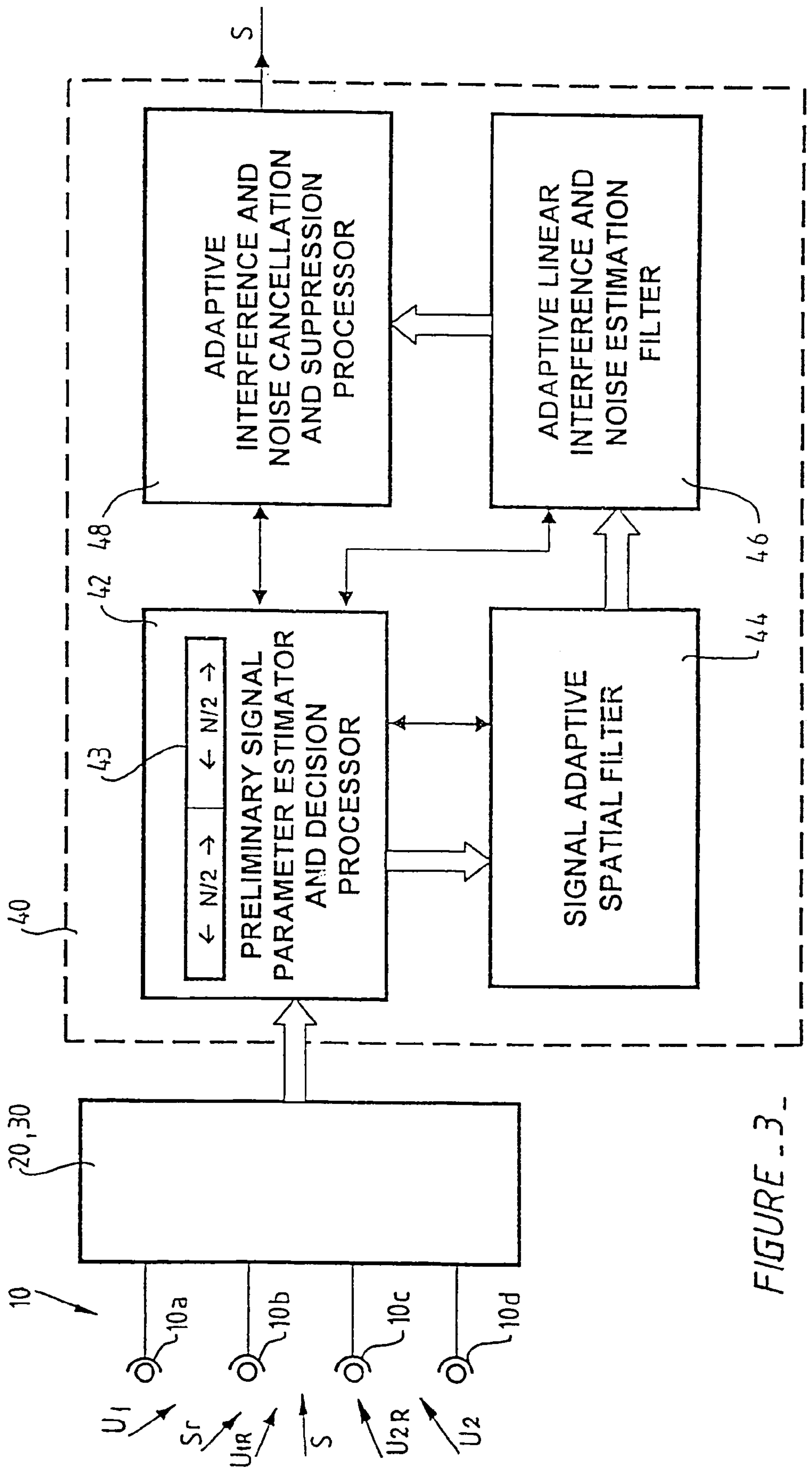
FIG. 3 is a system level block diagram of the described embodiment of FIG. 2.

FIG. 3 shows the major functional blocks of the digital processor in more detail. The multiple input coupled signals are received by the four-channel microphone array 10*a*-10*d*, each of which forms a signal channel, with channel 10*a* being the reference channel. The received signals are passed to a receiver front end which provides the functions of amplifiers 20 and analogue to digital converters 30 in a single custom chip. The four channel digitized output signals are fed in parallel to the digital signal processor 40. The digital signal processor 40 comprises four sub-processors. They are (a) a Preliminary Signal Parameters Estimator and Decision Processor 42, (b) a Signal Adaptive Spatial Filter 44, (c) an Adaptive Linear Interference and Noise Estimator 46, and (d) an Adaptive Interference and Noise Cancellation and Suppression Processor 48. The basic signal flow is from processor 42, to processor 44, to processor 46, to processor 48. These connections being represented by thick arrows in FIG. 3. The filtered signal S is output from processor 48. Decisions necessary for the operation of the processor 40 are generally made by processor 42 which receives information from processors 44-48, makes decisions on the basis of that information and sends instructions to processors 44-48, through connections represented by thin arrows in FIG. 3.

It will be appreciated that the splitting of the processor 40 into the four component parts 42, 44, 46, 48 is essentially notional and is made to assist understanding of the operation of the processor. The processor 40 would in reality be embodied as a single multi-function digital processor performing the functions described under control of a program with suitable memory and other peripherals.

Figure 4A:
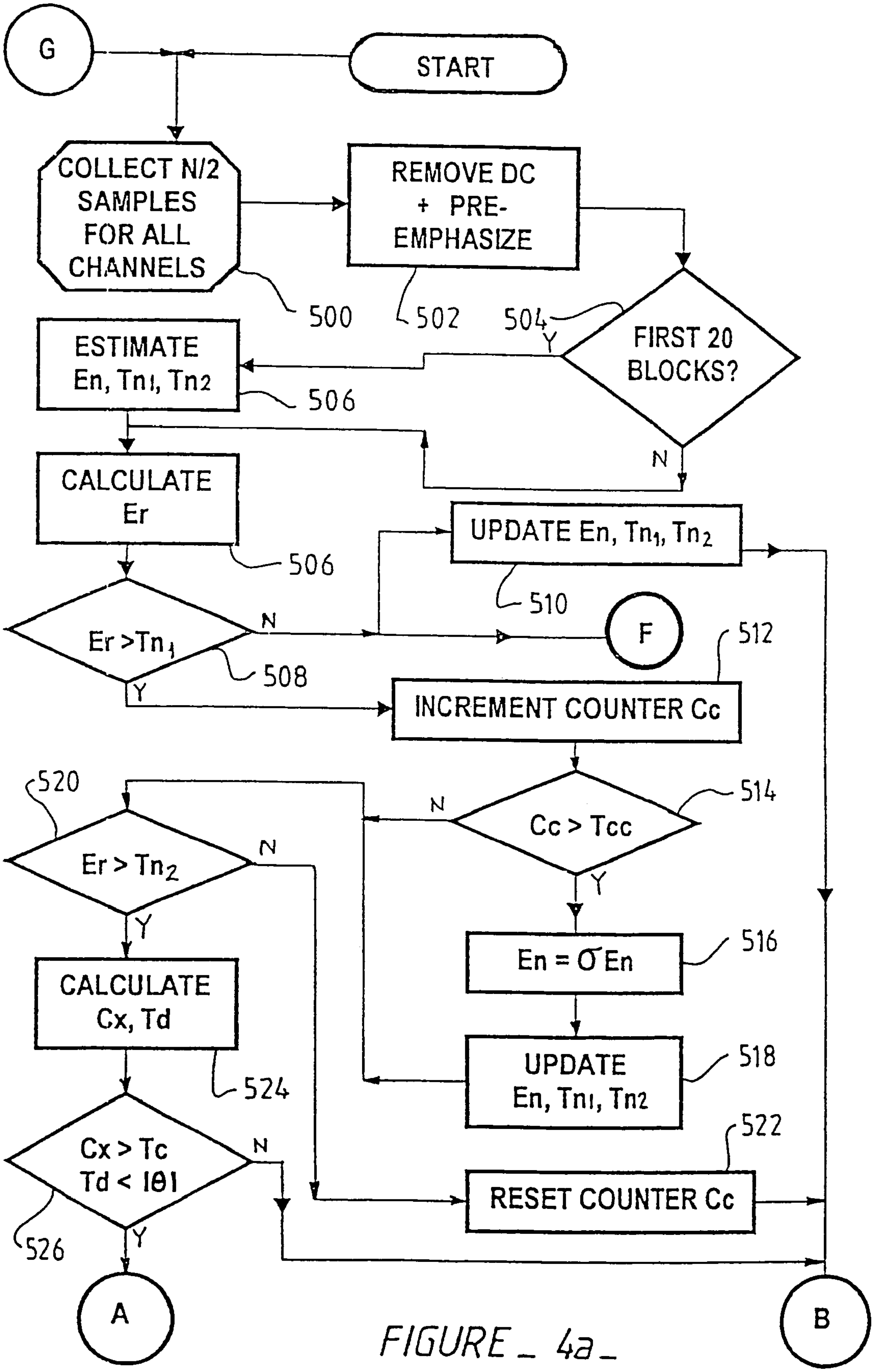
FIG. 4*a-c* is a flow chart illustrating the operation of the embodiment of FIG. 3.
Figure 4B:
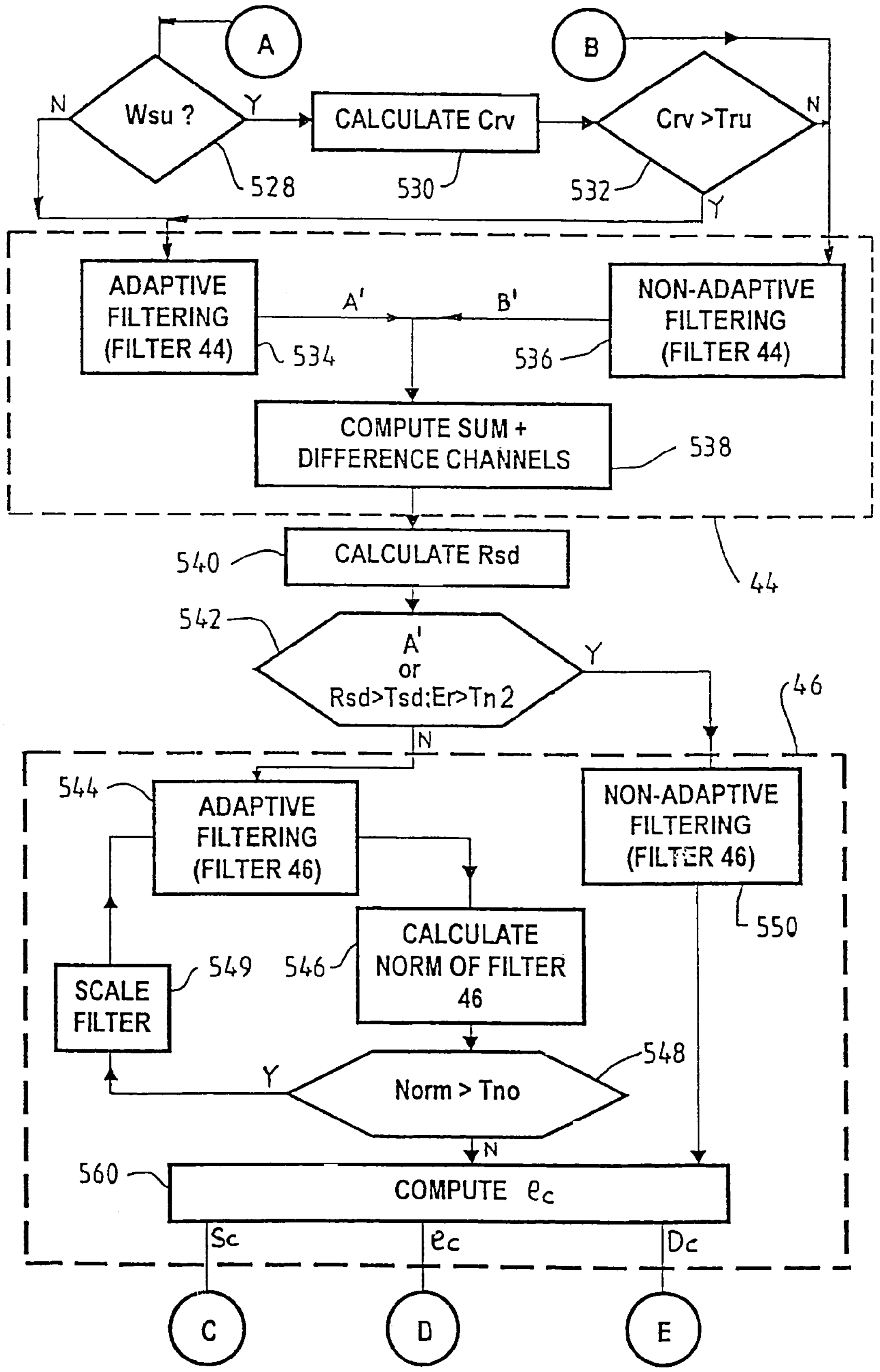
Figure 4C:
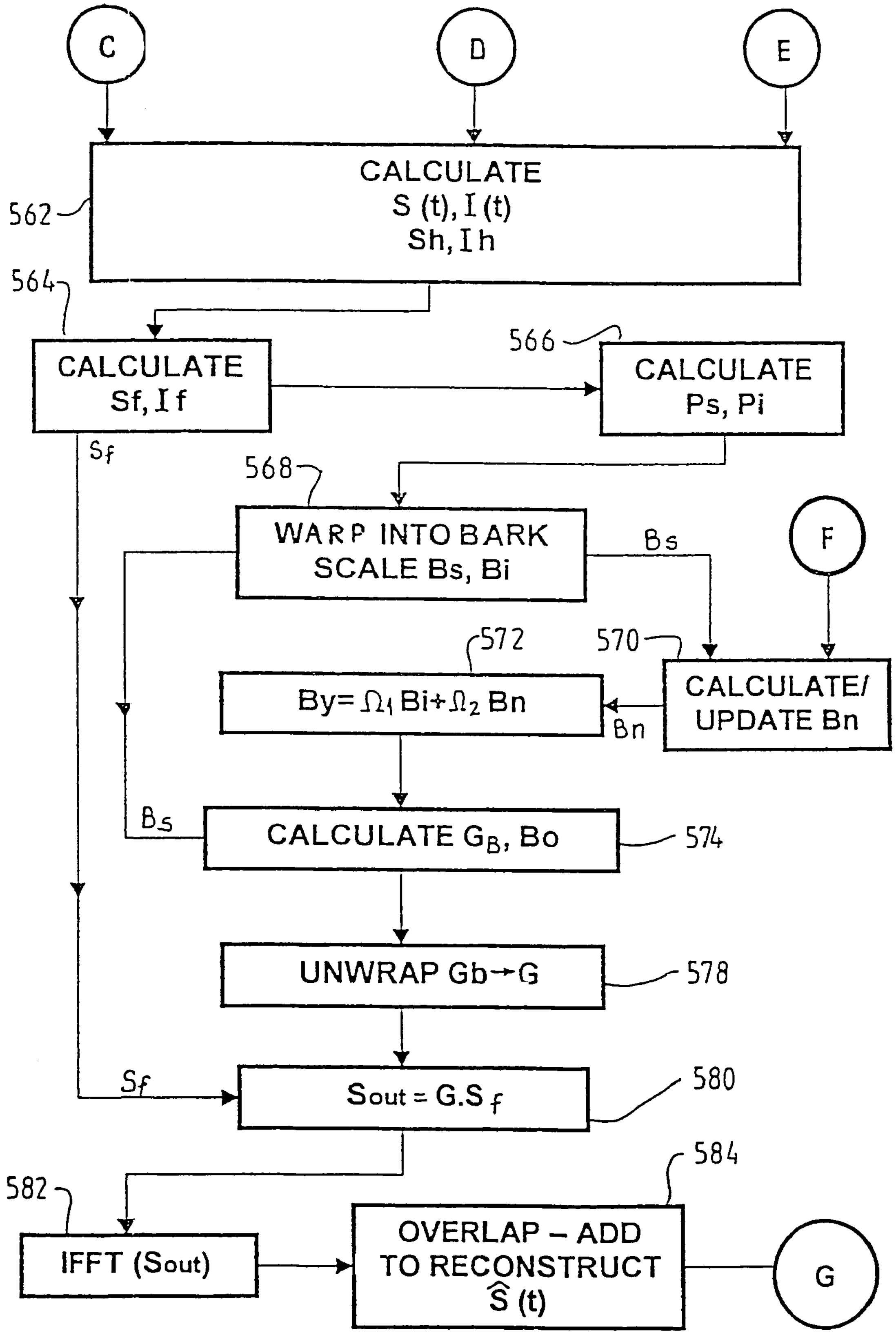

A flowchart illustrating the operation of the processors is shown in FIGS. 4*a-c* and this will firstly be described generally. A more detailed explanation of aspects of the processor operation will then follow.

The front end 20,30 processes samples of the signals received from array 10 at a predetermined sampling frequency, for example 16 kHz. The processor 42 includes an input buffer 43 that can hold N such samples for each of the four channels. Upon initialization, the apparatus collects a block of N/2 new signal samples for all the channels at step 500, so that the buffer holds a block of N/2 new samples and a block of N/2 previous samples. The processor 42 then removes any DC from the new samples and preemphasizes or whitens the samples at step 502.

There then follows a short initialization period at step 504 in which the first 20 blocks of N/2 samples of signal after start-up are used to estimate the environment noise energy $E_n$ and two detection thresholds, a noise threshold $T_{n1}$ and a larger signal threshold $T_{n2}$, are calculated by processor 42 from $E_n$ using scaling factors. During this short period, an assumption is made that no target signals are present. These signals do, however, continue to be processed, so that an initial Bark Scale system noise value may be derived at step 570, below.

After this initialisation period, the energies and thresholds update automatically as described below. The samples from the reference channel 10*a* are used for this purpose although any other channel could be used.

The total non-linear energy of the signal samples $E_r$ is then calculated at step 506.

At step 508, it is determined if the signal energy $E_r$ is greater than the signal threshold $T_{n1}$. If not, the environment noise $E_n$ and the two thresholds are updated at step 510 using the new value of $E_r$ calculated in step 506. The Bark Scale system noise $B_n$ (see below) is also similarly updated via point F. The routine then moves to point B. If so, the signal is passed to a threshold adjusting sub-routine 512-518.

Figure 12:
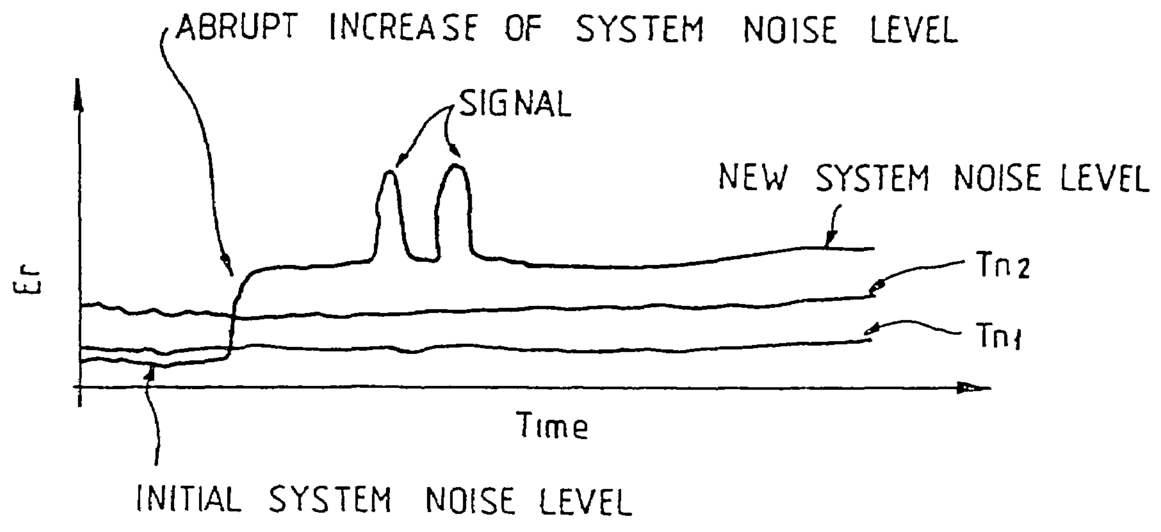
FIG. 12 illustrates a sudden rise of noise level of the nonlinear energy plot.
Figure 13:
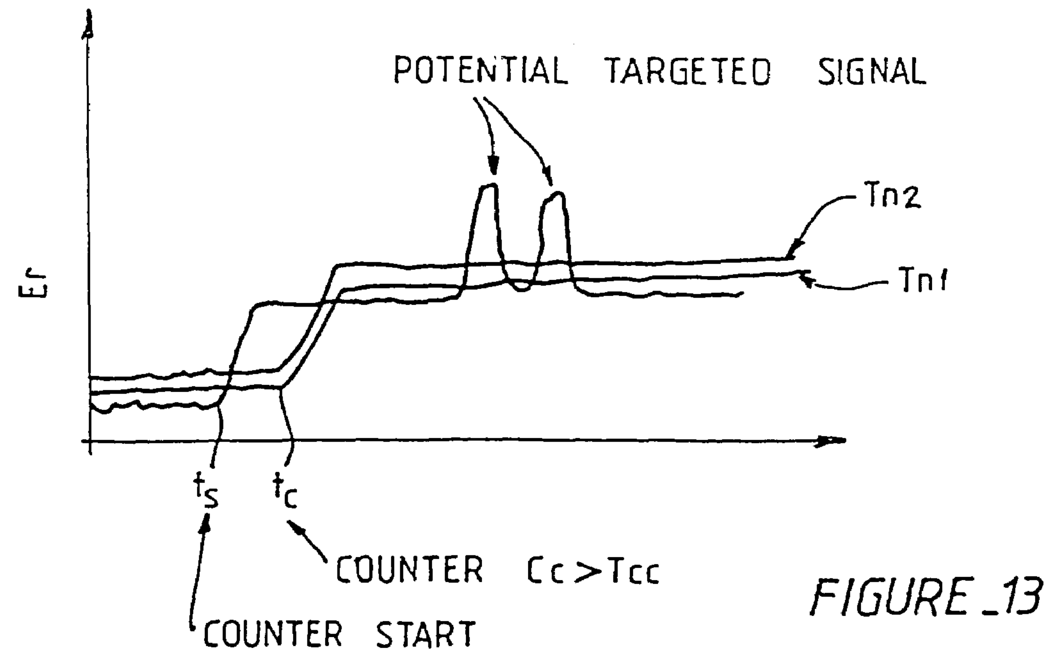
FIG. 13 illustrates the readjustment of the thresholds to reflect the sudden rise of noise energy level.

Steps 512-518 are used to compensate for abrupt changes in environment noise level which may capture the thresholds. A time counter is used to determine if the signal level shows a steady state increase which would indicate an increase in noise, since the speech target signal will show considerable variation over time and thus can be distinguished. This is illustrated in FIG. 12 in which a signal noise level rises from an initial level to a new level which exceeds both thresholds. At step 512 a time counter $C_c$ is incremented. At step 514 $C_c$ is checked against a threshold $T_{cc}$. If the threshold is not reached, the program moves to step 520 described below. If the threshold is reached, the estimated noise energy $E_n$ is then increased at step 516 by a multiple σ and $E_n$, $T_{n1}$ and $T_{n2}$ are updated at step 518. The effect of this is illustrated in FIG. 13. The counter is reset and updating ceases when the the signal energy $E_r$ is less than the second threshold $T_{n2}$ as tested at step 520 below.

A test is made at step 520 to see if the estimated energy $E_r$ in the reference channel 10*a* exceeds the second threshold $T_{n2}$. If so, a candidate target signal is deemed to be present. The apparatus only wishes to process candidate target signals that impinge on the array 10 from a known direction normal to the array, hereinafter referred to as the boresight direction, or from a limited angular departure therefrom, in this embodiment plus or minus 15 degrees. Therefore the next stage is to check for any signal arriving from this direction.

At step 524 two coefficients are established, namely a correlation coefficient $C_x$ and a correlation time delay $T_d$, which together provide an indication of the direction from which the target signal arrived.

At step 526, two tests are conducted to determine if the candidate target signal is an actual target signal. First, the crosscorrelation coefficient $C_x$ must exceed a predetermined threshold $T_c$ and, second, the size of the time delay coefficient must be less than a value θ indicating that the signal has impinged on the array within the predetermined angular range. If these conditions are not met, the signal is not regarded as a target signal and the routine passes to point B. If the conditions are met, the routine passes to point A.

If at step 520, the estimated energy $E_r$ in the reference channel 10*a* is found not to exceed the second threshold $T_{n2}$, the target signal is considered not to be present and the routine passes to point B via step 522 in which the counter $C_c$ is reset. This is done since the second threshold at this point is above the level of the total signal energy $E_r$ indicating that the threshold must be, consequently, above the environment noise energy level $E_n$ and thus updating of $E_n$ is no longer necessary.

Thus, the signal has, by points A and B, been preliminarily classified into a target signal (point A) or a noise signal (point B).

Following point A, the signal is subject to a further test at steps 528-532. At step 528, it is determined if the filter coefficients $W_{su}$ of filter 44 have yet been updated. If not, the subsequent steps 530, 532 are skipped, since these rely on the coefficients of filter 44 for calculation purposes. If so, a reverberation coefficient $C_{rv}$ which provides a measure of the degree of reverberation of the signal is calculated and at step 532 it is determined if $C_{rv}$ exceeds a threshold $T_{rv}$ If so, this indicates an acceptable level of reverberation in the signal and the routine passes to step 534 (target signal filtering). If not, the signal joins the path from point B to step 536 (non-target signal filtering).

The now confirmed target signal is fed to the Signal Adaptive Spatial Filter 44, the purpose of which is to enhance the target signal. The filter is instructed to perform adaptive filtering at steps 534 and 538, in which the filter coefficients $W_{su}$ are adapted to provide a “target signal plus noise” signal in the reference channel and “noise only” signals in the remaining channels using the Least Mean Square (LMS) algorithm. The filter 44 output channel equivalent to the reference channel is for convenience referred to as the Sum Channel and the filter 44 output from the other channels, Difference Channels. The signal so processed will be, for convenience, referred to as A'.

If the signal is considered to be a noise signal, the routine passes to step 536 in which the signals are passed through filter 44 without the filter coefficients being adapted, to form the Sum and Difference channel signals. The signals so processed will be referred to for convenience as B'.

The effect of the filter 44 is to enhance the signal if this is identified as a target signal but not otherwise.

At step 540, an energy ratio $R_{sd}$ between the Sum Channel and the Difference Channels is estimated by processor 42. At step 542 two tests are made. First, if the signals are A' signals from step 534, the routine passes to step 550. Second, for those signals for which $E_r > T_{n2}$ (i.e., high energy level), $R_{sd}$ is compared to a threshold $T_{sd}$. If the ratio is lower than $T_{sd}$, this indicates probable noise but if higher, this may indicate that there has been some leakage of the target signal into the Difference channel, indicating the presence of a target signal after all. For such target signals the routine also passes to step 550. For all other non-target signals, the routine passes to step 544.

At steps 544-560, the signals are processed by the Adaptive Linear Interference and Noise Estimation Filter 46, the purpose of which is to reduce the unwanted signals. The filter 46, at step 544, is instructed to perform adaptive filtering on the non-target signals with the intention of adapting the filter coefficients to reducing the unwanted signal in the Sum channel to some small error value $e_c$.

To further prevent signal cancellation, the norm of the filter coefficients is calculated by processor 42 at step 546. If this norm exceeds a predetermined value [$T_{no}$] at step 548, then the filter coefficients are scaled at step 549 to a reduced value.

In the alternative, at step 550, the target signals are fed to the filter 46 but this time, no adaptive filtering takes place, so the Sum and Difference signals pass through the filter.

An output of the Sum Channel signal without alteration is also passed through the filter 46.

The output signals from processor 46 are thus the Sum channel signal $S_c$ (point C), filtered Difference signals $D_c$ (point E) and the error signal $e_c$ (point D). At step 562, a weighted average S(t) of the error signal $e_c$ and the Sum Channel signal is calculated and the signals from the Difference channels $D_c$ are Summed to form a single signal I(t).

Figure 10:
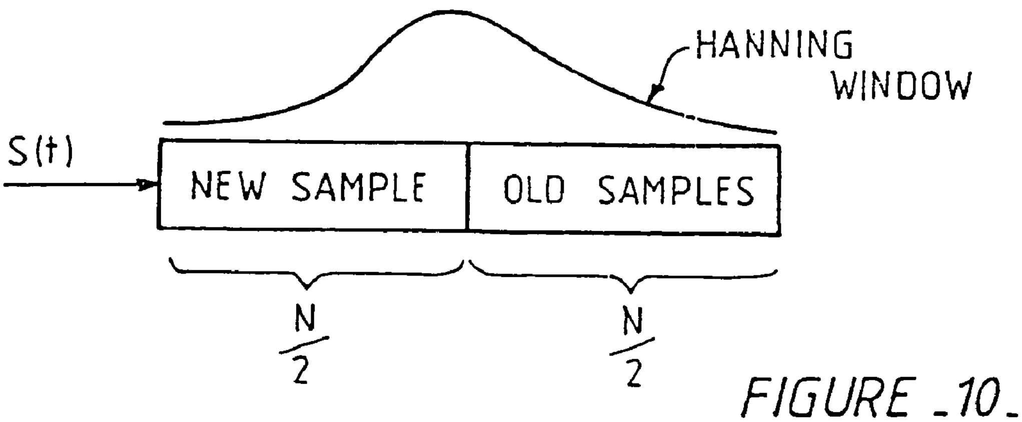
FIG. 10 shows an input signal buffer.
Figure 11:
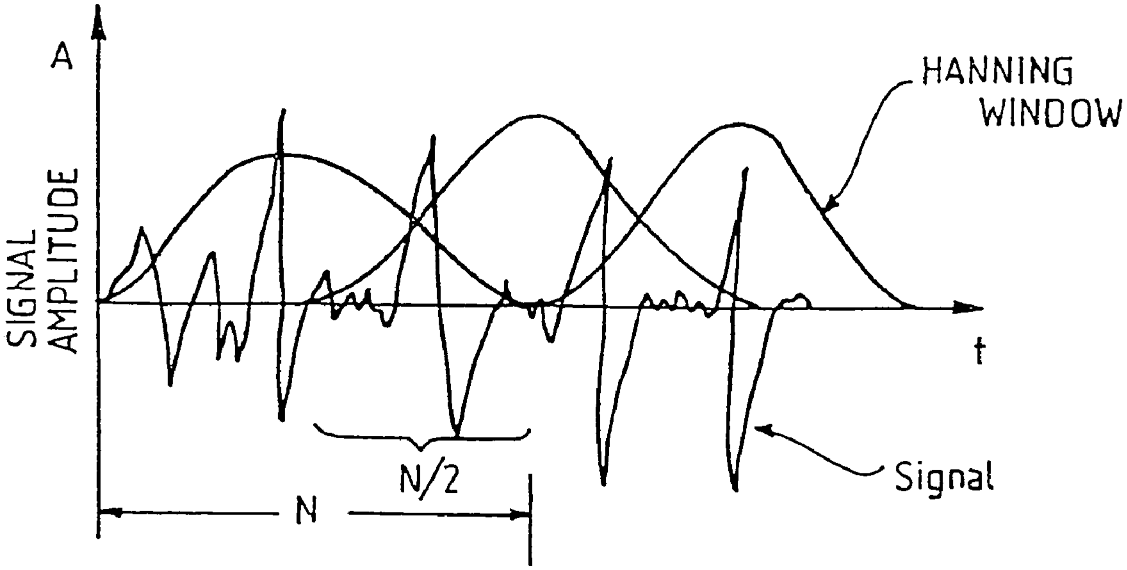
FIG. 11 shows the use of a Hanning Window on overlapping blocks of signals.

These signals S(t) and I(t) are then collected for the new N/2 samples and the last N/2 samples from the previous block and a Hanning Window $H_n$ is applied to the collected samples as shown in FIG. 10 to form vectors $S_h$ and $I_h$. This is an overlapping technique with overlapping vectors $S_n, I_n$ being formed from past and present blocks of N/2 samples continuously. This is illustrated in FIG. 11. A Fast Fourier Transform is then performed on the vectors $S_h$ and $I_h$ to transform the vectors into frequency domain equivalents $S_f$ and $I_f$, at step 564.

At step 566 a modified spectrum is calculated for the transformed signals to provide "pseudo" spectrum values $P_s$ and $P_i$ and these values are warped into the same Bark Frequency Scale to provide Bark Frequency scaled values $B_s$ and $B_i$ at step 568.

The Bark value $B_n$ of the system noise of the Sum Channel is updated at step 570 using $B_s$ and the previous value of $B_n$, if the condition at step 508 is met (through path F). At start-up, $B_n$ is initially calculated at this block whether or not the condition is met. At this time, there must be no target signal present, thus requiring a short initialization period after signal detection has begun, for this initial $B_n$ value to be established.

A weighted combination By of $B_n$ and $B_i$ is then made at step 572 and this is combined with $B_s$ to compute the Bark Scale nonlinear gain $G_b$ at step 574.

$G_b$ is then unwarped to the normal frequency domain to provide a gain value G at step 578 and this is then used at step 580 to compute an output spectrum $S_{out}$ using the signal spectrum $S_f$ from step 564. This gain-adjusted spectrum suppresses both the interference signals, the environmental noise and system noise.

An inverse FFT is then performed on the spectrum $S_{out}$ at step 582 and the output signal is then reconstructed from the overlapping signals using the overlap add procedure at step 584.

Major steps in the above described flowchart will now be described in more detail.

NonLinear Energy and Threshold Estimation and Updating (Steps 506.510)

The processor 42 estimates the energy output from a reference channel. In the four channel example described, channel 10*a* is used as the reference channel.

N/2 samples of the digitized signal are buffered into a shift register to form a signal vector of the following form:

$$X_r = \begin{bmatrix} X(0) \\ X(1) \\ \vdots \\ X(J-1) \end{bmatrix} \quad \text{A.1}$$

Where J=N/2. The size of the vector depends on the resolution requirement. In the preferred embodiment, J=256 samples.

The nonlinear energy of the vector is then estimated using the following equation:

$$E_r = \frac{1}{J-2}\sum_{i=1}^{J-2} X(i)^2 - X(i+1)X(i-1) \quad \text{A.2}$$

When the system is initialized, the average system and environment noise energy is estimated using the first 20 blocks of signal. A first order recursive filter is used to carry out this task as shown below:

$$E_n^{K+1} = \alpha E_n^K + (1-\alpha)E_r^{K+1} \quad \text{A.3}$$

Where the superscript K is the block number and α is an empirically chosen weight between zero and one. In this embodiment, α=0.9.

Once the noise energy $E_n$ is obtained, the two signal detection thresholds Tn1 and $T_{n2}$ are established as follows:

$$T_{n1} = \delta_1 E_n \quad \text{A.4}$$

$$T_{n2} = \delta_n E_n \quad \text{A.5}$$

Figure 5:
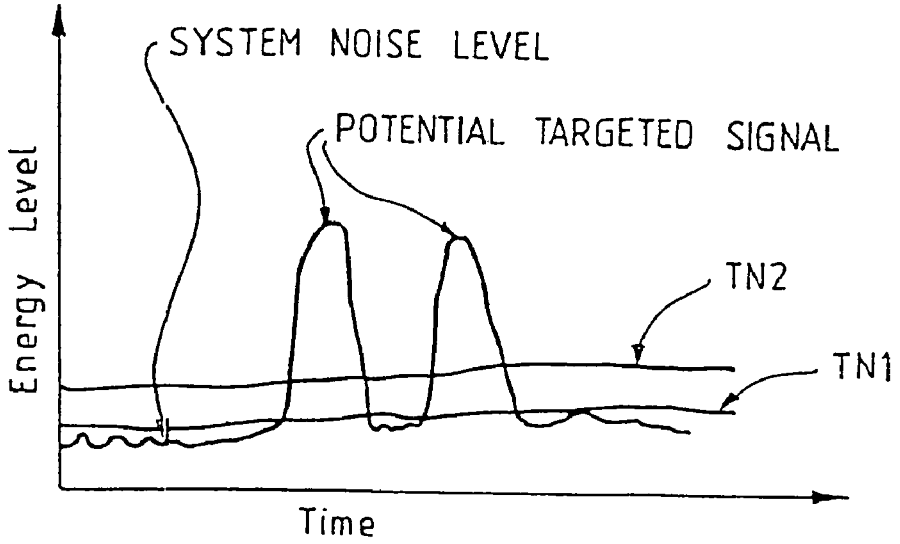
FIG. 5 illustrates a typical plot of nonlinear energy of a channel and the established thresholds.

$\delta_1$ and $\delta_2$ are scalar values that are used to select the thresholds so as to optimize signal detection and minimize false signal detection. As shown in FIG. 5, $T_{n1}$ should be above the system noise level, with $T_{n2}$ sufficient to be generally breached by the potential target signal. These thresholds may be found by trial and error. In this embodiment, $\delta_1$=1.125 and $\delta_2$=1.8 have been found to give good results.

Once the thresholds have been established, $E_n$ may be updated after initialization in step 510 as follows:

$$\text{If } E_r < T_{nl} \quad \text{A.6}$$

$$E_n = \alpha_n + (1-\alpha)E_r$$

Else $$E_n = E_n$$

The updated thresholds may then be calculated according to equations A.4 and A.5.

Time Delay Estimation ($T_d$) (Step 524)

Figure 6A:
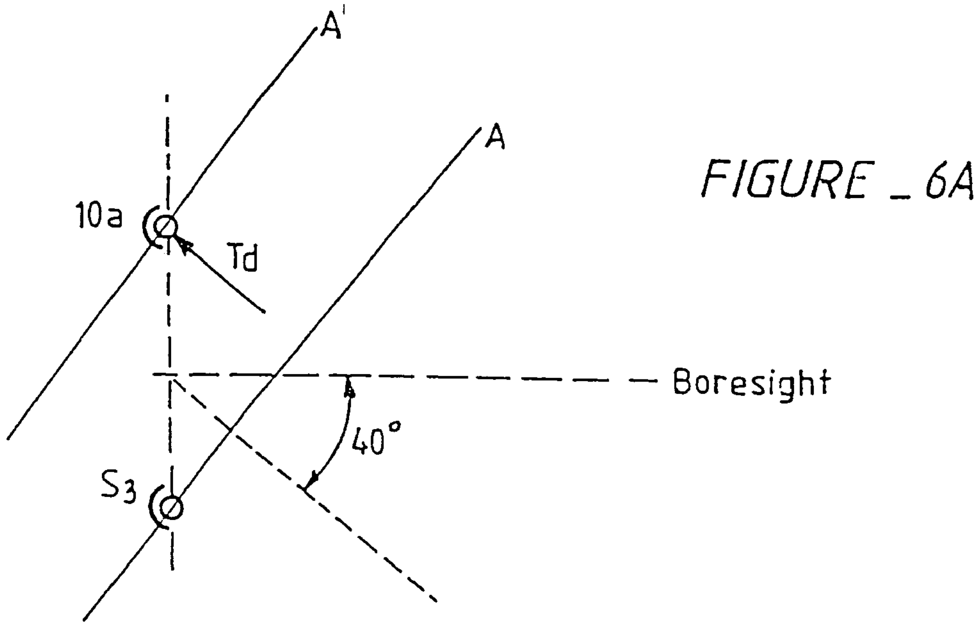
FIG. 6(*a*) illustrates a wavefront arriving from 40 degree off-boresight direction FIG. 6(*b*) represents a time delay estimator using an adaptive filter FIG. 6(*c*) shows the impulse response of the filter indicates a wave front from the boresight direction.

FIG. 6A illustrates a single wave front impinging on the sensor array. The wave front impinges on sensor 10*d* first (A as shown) and at a later time impinges on sensor 10*a* (A' as shown), after a time delay $t_d$. This is because the signal originates at an angle of 40 degrees from the boresight direction. If the signal originated from the boresight direction, the time delay $t_d$ will have been zero ideally.

Figure 6B:
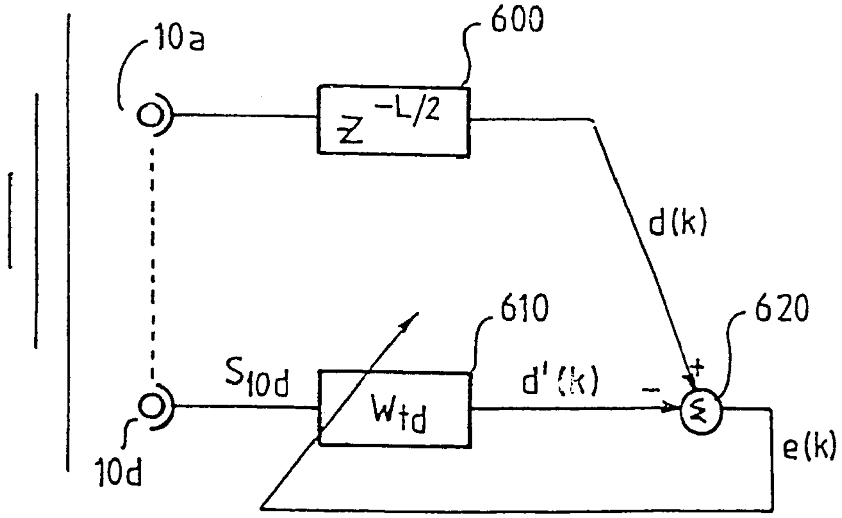

Time delay estimation of performed using a tapped delay line time delay estimator included in the processor 42 which is shown in FIG. 6B. The filter has a delay element 600, having a delay $Z^{-L/2}$, connected to the reference channel 10*a* and a tapped delay line filter 610 having a filter coefficient $W_{td}$ connected to channel 10*d*. Delay element 600 provides a delay equal to half of that of the tapped delay line filter 610. The outputs from the delay element is d(k) and from filter 610 is d'(k). The Difference of these outputs is taken at element 620 providing an error signal e(k) (where k is a time index used for ease of illustration). The error is fed back to the filter 610. The Least Mean Squares (LMS) algorithm is used to adapt the filter coefficient $W_{td}$ as follows:

$$W_{td}(k+1) = W_{td}(k) + 2\mu_{td}S_{10d}(k)e(k) \quad \text{B.1}$$

$$W_{td}(k+1) = \begin{bmatrix} W_{td}^{0}(k+1) \\ W_{td}^{1}(k+1) \\ \vdots \\ W_{td}^{L_0}(k+1) \end{bmatrix} \quad \text{B.2}$$

$$S_{10d}(k) = \begin{bmatrix} S_{10d}^{0}(k) \\ S_{10d}^{1}(k) \\ \vdots \\ S_{10d}^{L_0}(k) \end{bmatrix} \quad \text{B.3}$$

$$e(k) = d(k) - d'(k) \quad \text{B4}$$

$$d'(k) = W_{td}(k)^T \cdot S_{10d}(k) \quad \text{B.5}$$

$$\mu_{td} = \frac{\beta_{td}}{\|S_{10d}(k)\|} \quad \text{B.6}$$

where $\beta_{td}$ is a user selected convergence factor $0<\beta_{td}\leqq 2$, |||| denoted the norm of a vector, k is a time index, $L_o$ is the filter length.

Figure 6C:
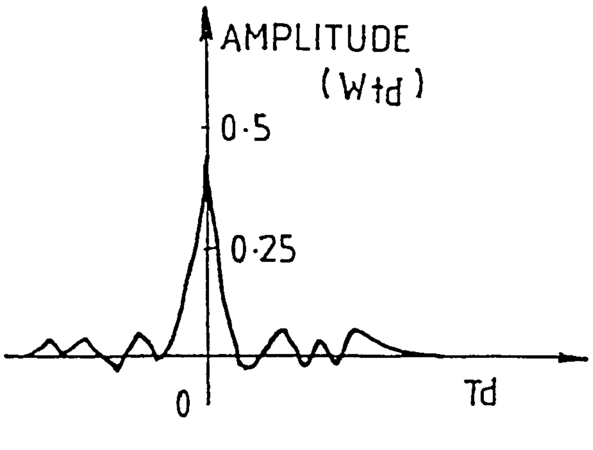

The impulse response of the tapped delay line filter 620 at the end of the adaptation is shown in FIG. 6*c*. The impulse response is measured and the position of the peak or the maximum value of the impulse response relative to origin O gives the time delay $T_d$ between the two sensors which is also the angle of arrival of the signal. In the case shown, the peak lies at the centre indicating that the signal comes from the boresight direction ($T_d$=0). The threshold θ at step 506 is selected depending upon the assumed possible degree of departure from the boresight direction from which the target signal might come. In this embodiment, θ is equivalent to ±15°.

Normalized Cross Correlation Estimation $C_x$ (Step 524)

The normalized crosscorrelation between the reference channel 10*a* and the most distant channel 10*d* is calculated as follows:

Samples of the signals from the reference channel 10*a* and channel 10*d* are buffered into shift registers X and Y where X is of length J samples and Y is of length K samples, where J>K, to form two independent vectors $X_r$ and $Y_r$:

$$X_r = \begin{bmatrix} x_r(1) \\ x_r(2) \\ \vdots \\ x_r(J) \end{bmatrix} \quad \text{C.1}$$

$$Y_r = \begin{bmatrix} y_r(1) \\ y_r(2) \\ \vdots \\ y_r(K) \end{bmatrix} \quad \text{C.2}$$

A time delay between the signals is assumed, and to capture this Difference, J is made greater than K. The Difference is selected based on angle of interest. The normalized cross-correlation is then calculated as follows:

$$C_x(1) = \frac{Y_r^T * X_{rl}}{\|Y_r\|\|X_{rl}\|} \quad \text{C.3}$$

$$\text{Where} \ldots X_{rl} = \begin{bmatrix} X_r(l) \\ X_r(l+1) \\ \vdots \\ x_r(K+l-1) \end{bmatrix} \quad \text{C.4}$$

Where $^T$ represents the transpose of the vector and |||| represent the norm of the vector and l is the correlation lag. l is selected to span the delay of interest. For a sampling frequency of 16 kHz and a spacing between sensors 10*a*, 10*d* of 18 cm, the lag l is selected to be five samples for an angle of interest of 15°.

The threshold $T_c$ is determined empirically. $T_c$=0.85 is used in this embodiment.

Signal Reverberation Estimation $C_{rv}$ (Step 530)

The degree of reverberation of the received signal is calculated using the time delay estimator filter weight [$W_{td}$] used in calculation of $T_d$ above and the set of spatial filter weights [$W_{su}$] from filter 44 (described below) as shown in the following equation:

$$C_{rv}^{m} = \frac{W_{td}^T W_{su}^m}{\|W_{td}\|\|W_{su}^m\|} \quad \text{D.1}$$

Where $^T$ represents the transpose of the vector and M is the channel associated with the filter coefficient $W_{su}$. In this embodiment, three values for $C_{rv}$, one for each filter coefficient $W_{su}$ are calculated. The largest is taken for subsequent processing.

Figure 7:
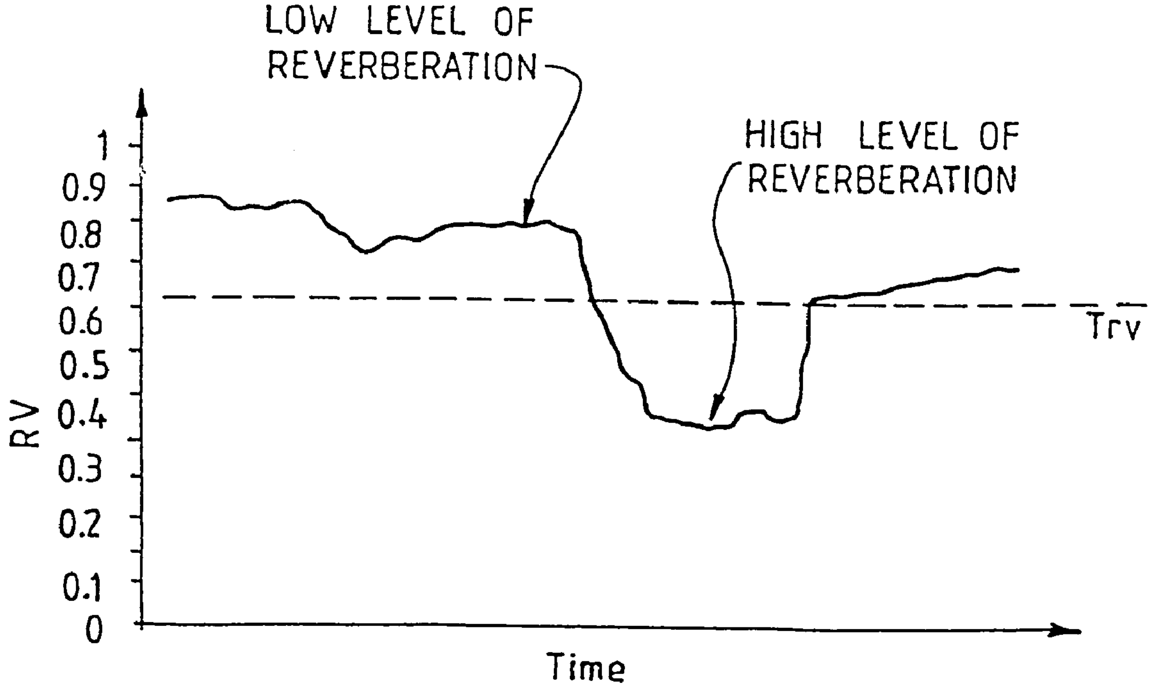
FIG. 7 illustrates the reverberation level of the received signal over time.

The threshold $T_{rv}$ used in step 506 is selected to ensure that the signal is selected as a target signal only when the level of reverberation is moderate, as illustrated in FIG. 7.

Adaptive Spatial Filter 44 (Steps 534,536)

Figure 8:
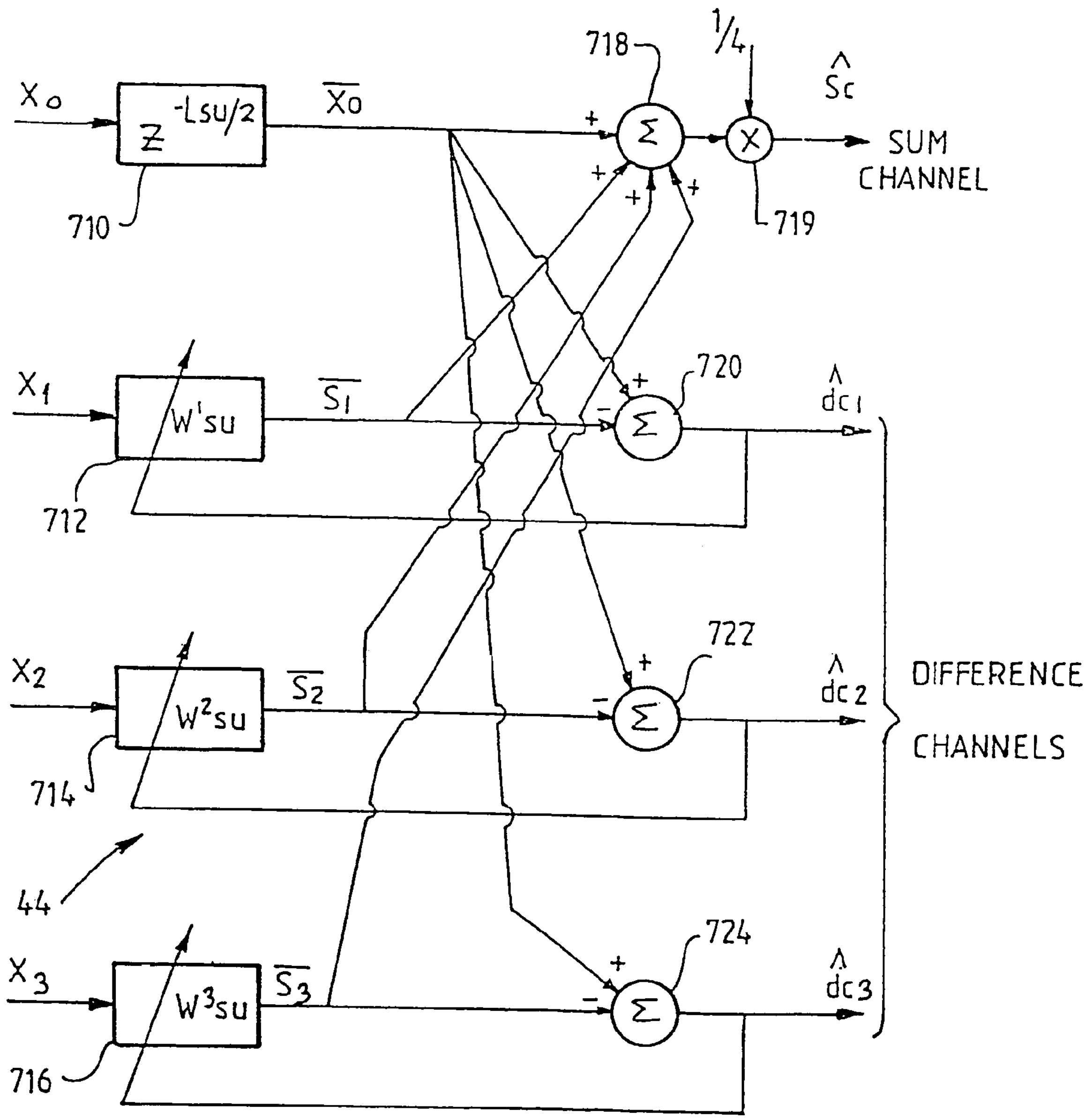
FIG. 8 shows the schematic block diagram the four channel Adaptive Spatial Filter.

FIG. 8 shows a block diagram of the Adaptive Linear Spatial Filter 44. The function of the filter is to separate the coupled target interference and noise signals into two types. The first, in a single output channel termed the Sum Channel, is an enhanced target signal having weakened interference and noise i.e. signals not from the target signal direction. The second, in the remaining channels termed Difference Channels, which in the four channel case comprise three separate outputs, aims to comprise interference and noise signals alone.

The objective is to adapt the filter coefficients of filter 44 in such a way so as to enhanced the target signal and output it in the Sum Channel and at the same time eliminate the target signal from the coupled signals and output them into the Difference Channels.

The adaptive filter elements in filter 44 act as linear spatial prediction filters that predict the signal in the reference channel whenever the target signal is present. The filter stops adapting when the signal is deemed to be absent.

The filter coefficients are updated whenever the conditions of steps 504 and 506 are met, namely:

(i) The adaptive threshold detector detects the presence of signal;

(ii) The time delay estimator indicates that the signal arrived from the predetermined angle;

(iii) The normalized cross correlation of the signal exceeds the threshold; and (iv) The reverberation level is low.

As illustrate in FIG. 8, the digitized coupled signal $X_0$ from sensor 10*a* is fed through a digital delay element 710 of delay $Z^{-Lsu/2}$. Digitized coupled signals $X_1$,$X_2$,$X_3$ from sensors 10*b*, 10*c*, 10*d* are fed to respective filter elements 712,4,6. The outputs from elements 710,2,4,6 are Summed at Summing element 718, the output from the Summing element 718 being divided by four at divider element 719 to form the Sum channel output signal. The output from delay element 710 is also subtracted from the outputs of the filters 712,4,6 at respective Difference elements 720,2,4, the output from each Difference element forming a respective Difference channel output signal, which is also fed back to the respective filter 712,4,6. The function of the delay element 710 is to time align the signal from the reference channel 10*a* with the output from the filters 712,4,6.

The filter elements 712,4,6 adapt in parallel using the LMS algorithm given by Equations E.1 . . . E.8 below, the output of the Sum Channel being given by equation E.1 and the output from each Difference Channel being given by equation E.6:

$$\hat{S}_c(k) = (\overline{S}(k) + \overline{X}_0(k))/4 \quad \text{E.1}$$

$$\text{Where: } \overline{S}(k) = \sum_{m=1}^{M-1} \overline{S}_m(k) \quad \text{E.2}$$

$$\overline{S}_m(k) = (W_{su}^m(k))^T X_m(k) \quad \text{E.3}$$

Where m is 0, 1, 2 . . . M-1, the number of channels, in this case 0 . . . 3 and $^T$ denotes the transpose of a vector.

$$X_m(k) = \begin{bmatrix} X_{1m}(k) \\ X_{2m}(k) \\ \vdots \\ X_{LSUm}(k) \end{bmatrix} \quad \text{E.4}$$

$$W_{su}^m(k) = \begin{bmatrix} W_{su1}^m(k) \\ W_{su2}^m(k) \\ \vdots \\ W_{su\,LSU}^m(k) \end{bmatrix} \quad \text{E.5}$$

Where $X_m$(k) and $W_{su}{}^m$(k) are column vectors of dimension $L_{su}$*1.

The weight $W_{su}{}^m$(k) is updated using the LMS algorithm as follows:

$$\hat{d}_{cm}(k) = \overline{X}_0(k) - \overline{S}_m(k) \quad \text{E.6}$$

$$W_{su}^m(k+1) = W_{su}^m(k) + 2\mu_{su}^m X_m(k)\hat{d}_{cm}(k) \quad \text{E.7}$$

$$\text{Where: } \mu_{su}^m = \frac{\beta_{su}}{\|X_m(k)\|} \quad \text{E.8}$$

and where $\beta_{su}$ is a user selected convergence factor $0<\beta_{su}\leqq 2$, ‖‖ denoted the norm of a vector and k is a time index.

Calculation of Energy Ratio $R_{sd}$ (step 540)

This is performed as follows:

$$\hat{S}_c = \begin{bmatrix} \hat{S}_c(0) \\ \hat{S}_c(1) \\ \vdots \\ \hat{S}_c(J-1) \end{bmatrix} \quad \text{F.1}$$

$$\hat{D}_c = \begin{bmatrix} \hat{d}_c(0) \\ \hat{d}_c(1) \\ \vdots \\ \hat{d}_c(J-1) \end{bmatrix} = \begin{bmatrix} \hat{d}_{c1}(0) \\ \hat{d}_{c1}(1) \\ \vdots \\ \hat{d}_{c1}(J-1) \end{bmatrix} + \begin{bmatrix} \hat{d}_{c2}(0) \\ \hat{d}_{c2}(1) \\ \vdots \\ \hat{d}_{c2}(J-1) \end{bmatrix} + \begin{bmatrix} \hat{d}_{c3}(0) \\ \hat{d}_{c3}(1) \\ \vdots \\ \hat{d}_{c3}(J-1) \end{bmatrix} \quad \text{F.2}$$

J=N/2, the number of samples, in this embodiment 256.

Where $E_{SUM}$ is the sum channel energy and $E_{DIF}$ is the difference channel energy.

$$E_{SUM} = \frac{1}{J-2}\sum_{j=1}^{J-2} \hat{S}_c(j)^2 - \hat{S}_c(j-1)\hat{S}_c(j-1) \quad \text{F.3}$$

$$E_{DIF} = \frac{1}{3(J-2)}\sum_{j=1}^{J-2} \hat{d}_c(j)^2 - \hat{d}_c(j-1)\hat{d}_c(j-1) \quad \text{F.4}$$

$$R_{sd} = \frac{E_{SUM}}{E_{DIF}} \quad \text{F.5}$$

The energy ratio between the Sum Channel and Difference Channel ($R_{sd}$) must not exceed a predetermined threshold. In the four channel case illustrated here the threshold is determined to be about 1.5.

Adaptive Interference and Noise Estimation Filter 46 (Steps 544,550)

Figure 9:
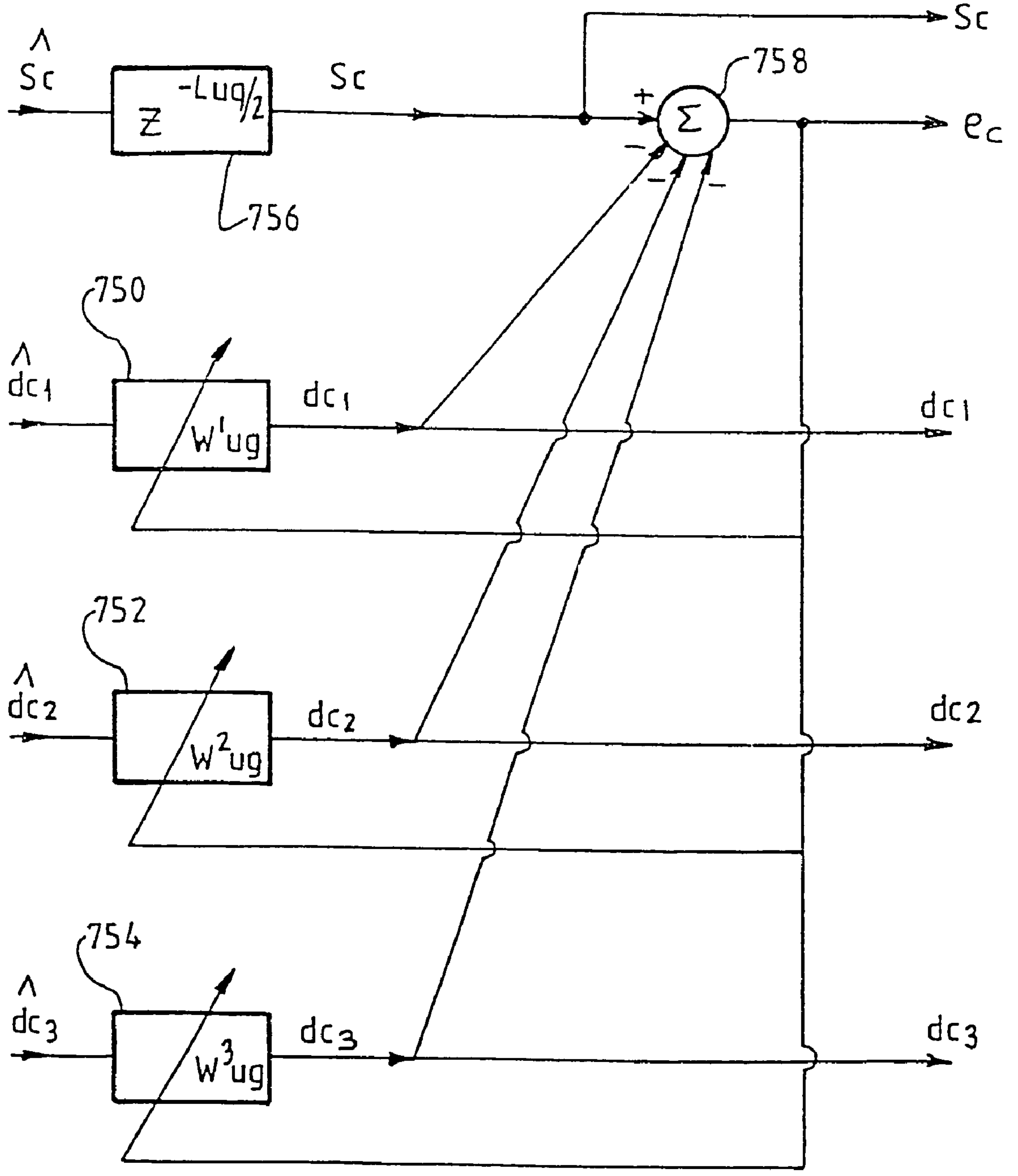
FIG. 9 shows the schematic block diagram of the Adaptive Interference and Noise Estimator of FIG. 3.

FIG. 9 shows a schematic block diagram of the Adaptive Interference and Noise Estimation Filter 46. This filter estimates the noise and interference signals and subtracts them from the Sum Channel so as to derive an output with reduced noise and interference.

The filter 46 takes outputs from the Sum and Difference Channels of the filter 44 and feeds the Difference Channel Signals in parallel to another set of adaptive filter elements 750,2,4 and feeds the Sum Channel signal to a corresponding delay element 756. The outputs from the three filter elements 750,2,4 are subtracted from the output from delay element 756 at Difference element 758 to form an error output $e_c$, which is also fed back to the filter elements 750,2,4. The output from filter element 756 is also passed directly as an output, as are the outputs from the three filter elements 750,2,4.

Again, the Least Mean Square algorithm (LMS) is used to adapt the filter coefficients Wuq as follows:

$$e_c(k) = \hat{S}_c(k) - \sum_{m=1}^{M-1} \hat{d}_{cm}(k) \quad \text{G.1}$$

$$\text{Where: } \hat{d}_{cm}(k) = W_{uq}^m(k)^T \cdot Y^m(k) \quad \text{G.2}$$

$$Y^m(k) = \begin{bmatrix} \hat{d}_{c1m}(k) \\ \hat{d}_{c2m}(k) \\ \vdots \\ \hat{d}_{cLuqm}(k) \end{bmatrix} \quad \text{G.3}$$

$$W_{uq}^m(k+1) = W_{uq}^m(k) + 2\mu_{uq}^m Y^m(k) e_c(k) \quad \text{G.4}$$

$$\mu_{uq}^m = \frac{\beta_{uq}}{\|Y^m\|} \quad \text{G.5}$$

and where $\beta_{uq}$ is a user selected convergence factor $0<\beta_{uq}\leqq 2$ and where m is 0, 1, 2 . . . M-1, the number of channels, in this case 0 . . . 3.

Calculation of Norm of Filter Coefficients (step 546)

The norms of the coefficients of filters 750,2,4 are also constrained to be smaller than a predetermined value. The rationale for imposing this constraint is because the norm of the filter coefficients will be large if a target signal leaks into the Difference Channel. Scaling down the norm value of the filter coefficients will reduce the effect of signal cancellation.

This is calculated as follows:

$$\text{If: } \|W_{uq}^m\| > T_{no} \quad \text{G.6}$$

$$\text{Then: } W_{uq}^m = \frac{W_{uq}^m}{\|W_{uq}^m\|} * C_{no} \quad \text{G.7}$$

Where m is 1,2 . . . M-1, the channels having $W_{uq}$ filters. $T_{no}$ is a predetermined threshold and $C_{no}$ is a scaling factor, both of which can be estimated empirically.

The output $e_c$ from equation F.1 is almost interference and noise free in an ideal situation. However, in a realistic situation, this can not be achieved. This will cause signal cancellation that degrades the target signal quality or noise or interference will feed through and this will lead to degradation of the output signal to noise and interference ratio. The signal cancellation problem is reduced in the described embodiment by use of the Adaptive Spatial Filter 44 which reduces the target signal leakage into the Difference Channel. However, in cases where the signal to noise and interference is very high, some target signal may still leak into these channels.

To further reduce the target signal cancellation problem and unwanted signal feed through to the output, The output signals from processor 46 are fed into the Adaptive Non-Linear Interference and Noise Suppression Processor 48 as described below.

Adaptive NonLinear Interference and Noise Suppression Processor 48 (Steps 562-584)

This processor processes input signals in the frequency domain coupled with the well-known overlap add block processing technique.

STEP 562: The output signal ($e_c$) and the Sum Channel output signal ($S_c$) combined as a weighted average as follows:

$$S(t)=W_1S_c(t)+W_2e_c(t) \quad \text{H.1}$$

The weights ($W_1$, $W_2$) can be empirically chosen to minimize signal cancellation or improve unwanted signal suppression. In this embodiment, $W_1=W_2=0.5$.

This combined signal is buffered into a memory as illustrated in FIG. 10. The buffer consists of N/2 of new samples and N/2 of old samples from the previous block. Similarly, the unwanted signals from the Difference Channel are summed in accordance with the following and buffered the same way as the Sum Channel:

$$I(t) = \sum_{i=1}^{M-1} D_{ci} \quad \text{H.2A}$$

$$\text{Where: } D_{ci} = \begin{bmatrix} d_{ci}(0) \\ d_{ci}(1) \\ \vdots \\ d_{ci}(J-1) \end{bmatrix} \quad \text{H.2B}$$

Where i=1,2 . . . M-1 and M is the number of channels, in this case M=4.

A Hanning Window is then applied to the N samples buffered signals as illustrated in FIG. 11 expressed mathematically as follows:

$$S_h = \begin{bmatrix} S_{(t+1)} \\ S_{(t+2)} \\ \vdots \\ S_{(t+N)} \end{bmatrix} \cdot H_n \quad \text{H.3}$$

$$I_h = \begin{bmatrix} I_{(t+1)} \\ I_{(t+2)} \\ \vdots \\ I_{(t+N)} \end{bmatrix} \cdot H_n \quad \text{H.4}$$

Where ($H_n$) is a Hanning Window of dimension N, N being the dimension of the buffer. The "dot" denotes point by point multiplication of the vectors. t is a time index.

Step 5.64: The resultant vectors $[S_h]$ and $[I_h]$ are transformed into the frequency domain using Fast Fourier Transform algorithm as illustrated in equations H.5 and H.6 below:

$$S_f = FFT(S_h) \qquad \text{H.5}$$

$$I_f = FFT(I_h) \qquad \text{H.6}$$

Step 566: A modified spectrum is then calculated, which is illustrated in Equations H.7 and H.8:

$$P_s = |\mathrm{Real}(S_f)| + |\mathrm{Imag}(S_f)| + F(S_f) * r_s \qquad \text{H.7}$$

$$P_i = |\mathrm{Real}(I_f)| + |\mathrm{Imag}(I_f)| + F(I_f) * r_i \qquad \text{H.8}$$

Where "Real" and "Imag" refer to taking the absolute values of the real and imaginary parts, $r_s$ and $r_i$ are scalars and $F(S_f)$ and $F(I_f)$ denotes a function of $S_f$ and $I_f$ respectively.

One preferred function F using a power function is shown below in equations H.9 and H.10 where "Conj" denotes the complex conjugate:

$$P_s = |\mathrm{Real}(S_f)| + |\mathrm{Imag}(S_f)| + (S_f * \mathrm{conj}(S_f)) * r_s \qquad \text{H.9}$$

$$P_i = |\mathrm{Real}(I_f)| + |\mathrm{Imag}(I_f)| + (I_f * \mathrm{conj}(I_f)) * r_i \qquad \text{H.10}$$

A second preferred function F using a multiplication function is shown below in equations H.11 and H.12:

$$P_s = |\mathrm{Real}(S_f)| + |\mathrm{Imag}(S_f)| + |\mathrm{Real}(S_f)| * |\mathrm{Imag}(S_f)| * r_s \qquad \text{H.11}$$

$$P_i = |\mathrm{Real}(I_f)| + |\mathrm{Imag}(I_f)| + |\mathrm{Real}(I_f)| * |\mathrm{Imag}(I_f)| * r_i \qquad \text{H.12}$$

The values of the scalars ($r_s$ and $r_i$) control the tradeoff between unwanted signal suppression and signal distortion and may be determined empirically. ($r_s$ and $r_i$) are calculated as $1/(2^{vs})$ and $1/(2^{vi})$ where vs and vi are scalars. In this embodiment, vs=vi is chosen as 8 giving $r_s = r_i = 1/256$. As vs,vi reduce, the amount of suppression will increase.

Step 568: The Spectra ($P_s$) and ($P_i$) are warped into (Nb) critical bands using the Bark Frequency Scale [see Lawrence Rabiner and Bing Hwang Juang, Fundamentals of Speech Recognition, Prentice Hall 1993]. The number of Bark critical bands depend on the sampling frequency used. For a sampling of 16 Khz, there will be Nb=25 critical bands. The warped Bark Spectrum of ($P_s$) and ($P_i$) are denoted as ($B_s$) and ($B_i$).

Step 570: A Bark Spectrum of the system noise and environment noise is similarly computed and is denoted as ($B_n$). $B_n$ is first established during system initialization as $B_n = B_s$ and continues to be updated when no target signal is detected (step 508) by the system i.e. any silence period. $B_n$ is updated as follows:

If $E_r < T_{n1}$ $B_n = \alpha B_n + (1-\alpha) B_s$

Else $$B_n = B_n \qquad \text{H.13}$$

Where $0<\alpha<1$; in this embodiment, $\alpha=0.9$

Steps 572,574: Using ($B_s$, $B_i$ and $B_n$) a nonlinear technique is used to estimate a gain ($G_b$) as follows:

First the unwanted signal Bark Spectrum is combined with the system noise Bark Spectrum using an appropriate weighting function as illustrate in Equation J.1.

$$B_y = \Omega_1 B_i + \Omega_2 B_n \qquad \text{J.1}$$

$\Omega_1$ and $\Omega_2$ are weights which can be chosen empirically so as to maximize unwanted signals and noise suppression with minimize signal distortion.

Follow that a post signal to noise ratio is calculated using Equations J.2 and J.3 below:

$$R_{po} = \frac{B_s}{B_y} \qquad \text{J.2}$$

$$R_{pp} = R_{po} - I_c \qquad \text{J.3}$$

The division in equation J.2 means element by element division and not vector division. $R_{po}$ and $R_{pp}$ are column vectors of dimension Nb*1, Nb being the dimension of the Bark Scale Critical Frequency Band and $I_c$ is a column unity vector of dimension Nb*1 as shown below:

$$R_{po} = \begin{bmatrix} r_{po(1)} \\ r_{po(2)} \\ \vdots \\ r_{po(N_b)} \end{bmatrix} \qquad \text{J.4}$$

$$R_{pp} = \begin{bmatrix} r_{pp(1)} \\ r_{pp(2)} \\ \vdots \\ r_{pp(N_b)} \end{bmatrix} \qquad \text{J.5}$$

$$I_c = \begin{bmatrix} 1 \\ 1 \\ \vdots \\ 1 \end{bmatrix} \qquad \text{J.6}$$

If any of the $r_{pp}$(nb)elements of $R_{pp}$ are less than zero, they are set equal to zero.

Using the Decision Direct Approach [see Y. Ephraim and D. Malah: Speech Enhancement Using Optimal NonLinear Spectrum Amplitude Estimation; Proc. IEEE International Conference Acoustics Speech and Signal Processing (Boston) 1983, pp 1118-1121.], the a-priori signal to noise ratio $R_{pr}$ is calculated as follows:

$$R_{pr} = (1-\beta_i) * R_{pp} + \beta_i \frac{B_o}{B_y} \qquad \text{J.7}$$

The division in Equation J.7 means element by element division. $B_o$ is a column vector of dimensions Nb*1 and denotes the output signal Bark Scale Bark Spectrum from the previous block $B_o = G_b \cdot B_s$ (see Eqn J.15) ($B_o$ initially is zero). $R_{pr}$ is also a column vector of dimension Nb*1. The value of $\beta_i$ is given in Table 1 below:

TABLE 1

| i | β |
|---|---|
| 1 | 0.01625 |
| 2 | 0.01225 |
| 3 | 0.245 |
| 4 | 0.49 |
| 5 | 0.98 |

The value i is set equal to 1 on the onset of a signal and the β value is therefore equal to 0.01625. Then the i value will count from 1 to 5 on each new block of N/2 samples processed and stay at 5 until the signal is off. The i will start from 1 again at the next signal onset and the β is taken accordingly.

Instead of β being constant, in this embodiment β is made variable and starts at a small value at the onset of the signal to prevent suppresion of the target signal and increases, preferably exponentially, to smooth $R_{pr}$.

From this, $R_{rr}$ is calculated as follows:

$$R_{rr} = \frac{R_{pr}}{I_c + R_{pr}} \qquad \text{J.8}$$

The division in Equation J.8 is again element by element. $R_{rr}$ is a column vector of dimension Nb*1.

From this, $L_x$ is calculated:

$$L_x = R_{rr} \cdot R_{po} \qquad \text{J.9}$$

The value of $L_x$ is limited to Pi (≈3.14). The multiplication in Equation J.9 means element by element multiplication. $L_x$ is a column vector of dimension Nb*1 as shown below:

$$L_X = \begin{bmatrix} l_x(1) \\ l_x(2) \\ \vdots \\ l_x(nb) \\ \vdots \\ l_x(Nb) \end{bmatrix} \qquad \text{J.10}$$

A vector $L_y$ of dimension Nb*1 is then defined as:

$$L_Y = \begin{bmatrix} l_y(1) \\ l_y(2) \\ \vdots \\ l_y(nb) \\ \vdots \\ l_y(Nb) \end{bmatrix} \qquad \text{J.11}$$

Where nb=1,2 . . . Nb. Then $L_y$ is given as:

$$l_y(nb) = \exp\left(\frac{E(nb)}{2}\right) \qquad \text{J.12}$$

and $$\begin{aligned} E(nb) &= -0.57722 - \log(l_x(nb)) + l_x(nb) - \\ &\quad (l_x(nb))^2/4 + l_x(nb)^3/8 \\ &= l_x(nb)^4/96 \end{aligned} \qquad \text{J.13}$$

E(nb) is truncated to the desired accuracy. $L_y$ can be obtained using a table look-up approach to reduce computational load.

Finally, the Gain $G_b$ is calculated as follows:

$$G_b = R_{rr} \cdot L_y \qquad \text{J.14}$$

The "dot" again implies element by element multiplication. $G_b$ is a column vector of dimension Nb*1 as shown:

$$G_b = \begin{bmatrix} g(1) \\ g(2) \\ \vdots \\ g(nb) \\ \vdots \\ g(Nb) \end{bmatrix} \qquad \text{J.15}$$

Step 578: As $G_b$ is still in the Bark Frequency Scale, it is then unwarped back to the normal linear frequency scale of N dimensions. The unwarped $G_b$ is denoted as G.

The output spectrum with unwanted signal suppression is given as:

$$\overline{S}_f = G \cdot S_f \qquad \text{J.16}$$

The "dot" again implies element by element multiplication.

Step 580: The recovered time domain signal is given by:

$$\overline{S}_t = \text{Real}(IFFT(\overline{S}_f)) \qquad \text{J.17}$$

IFFT denotes an Inverse Fast Fourier Transform, with only the Real part of the inverse transform being taken.

Step 584: Finally, the output time domain signal is obtained by overlap add with the previous block of output signal:

$$\hat{S}_t = \begin{bmatrix} \overline{S}_t(1) \\ \overline{S}_t(2) \\ \vdots \\ \overline{S}_t(N/2) \end{bmatrix} + \begin{bmatrix} Z_t(1) \\ Z_t(2) \\ \vdots \\ Z_t(N/2) \end{bmatrix} \qquad \text{J.18}$$

$$\text{Where: } Z_t = \begin{bmatrix} \overline{S}_{t-1}(1+N/2) \\ \overline{S}_{t-1}(2+N/2) \\ \vdots \\ \overline{S}_{t-1}(N) \end{bmatrix} \qquad \text{J.19}$$

The embodiment described is not to be construed as limitative. For example, there can be any number of channels from two upwards. Furthermore, as will be apparent to one skilled in the art, many steps of the method employed are essentially discrete and may be employed independently of the other steps or in combination with some but not all of the other steps. For example, the adaptive filtering and the frequency domain processing may be performed independently of each other and the frequency domain processing steps such as the use of the modified spectrum, warping into the Bark scale and use of the scaling factor β can be viewed as a series of independent tools which need not all be used together.

Use of first, second etc. in the claims should only be construed as a means of identification of the integers of the claims, not of process step order. Any novel feature or combination of features disclosed is to be taken as forming an independent invention whether or not specifically claimed in the appendant claims of this application as initially filed.

What is claimed is:

1. A method of processing signals received from an array of sensors, the method comprising:

sampling and digitally converting the received signals;

processing the digitally converted signals to provide an output signal, the processing including filtering the signals using a first adaptive filter that enhances a target signal of the digitally converted signals and a second adaptive filter that suppresses an unwanted signal of the digitally converted signals, and processing the filtered signals in a frequency domain to further suppress the unwanted signal;

processing the digitally converted signals to determine a direction of arrival of the target signal, the processing including filtering the signals using a third adaptive filter; and controlling the first adaptive filter to perform only when the target signal is present.

2. The method according to claim 1, further comprising:

determining a signal energy from the signals; and determining a noise energy from the signal energy.

3. The method according to claim 2 wherein the signal energy is determined by buffering N/2 samples of the digitized signal into a shift register to form a signal vector of the following form:

$$X_r = \begin{bmatrix} X(0) \\ X(1) \\ \vdots \\ X(J-1) \end{bmatrix}$$

where J=N/2; and estimating the signal energy using the following equation:

$$E_r = \frac{1}{(J-2)} \sum_{i=1}^{J-2} X(i)^2 - X(i+1)X(i-1)$$

where $E_r$ is the signal energy.

4. The method according to claim 2, wherein the noise energy is determined by measuring the signal energy $E_r$ of blocks of the digitally converted signals and calculating the noise energy $E_n$ in accordance with the following equation:

$$E_n^{K+1} = \alpha E_n^K + (1-\alpha) E_r^{K+1}$$

where the superscript K is the block number and α is an empirically chosen weight.

5. The method according to claim 2 further comprising:

determining a noise threshold from the noise energy; and updating the noise energy and the noise threshold when the signal energy is below the noise threshold.

6. The method according to claim 5 further comprising determining when a target signal is present by comparing the signal energy to a signal threshold.

7. The method according to claim 6 further comprising:

determining the signal threshold from the noise energy; and updating the signal threshold when the signal energy is below the noise threshold.

8. The method according to claim 5 wherein the noise threshold $T_{n1}$ is determined in accordance with the following equation:

$$T_{n1} = \delta_1 E_n$$

where $\delta_1$ is an empirically chosen value and $E_n$ is the noise energy.

9. The method as claimed in claim 6 wherein the signal threshold $T_{n2}$ is determined in accordance with:

$$T_{n2} = \delta_2 E_n$$

where $\delta_2$ is an empirically chosen value and $E_n$ is the noise energy.

10. The method according to claim 1, where the signals filtered by the third adaptive filter are from two spaced sensors of the array with a third adaptive filter to determine the direction of arrival.

11. The method as claimed in claim 1 further comprising treating the signal as an unwanted signal when the signal has not impinged on the array from within a selected angular range.

12. The method as claimed in claim 1 further comprising calculating a measure of the cross-correlation of signals from two spaced sensors of the array and treating the signal as an unwanted signal when the degree of cross correlation is less than a selected value.

13. The method as claimed in claim 1 further comprising:

processing the signals from two space sensors of the array with the third adaptive filter to determine the direction of arrival; and calculating a measure of reverberation of the signal from filter weights of the first and third adaptive filters.

14. The method as claimed in claim 13 wherein the reverberation measure $C_{rv}$ is calculated in accordance with $$C_{rv} = \frac{W_{td}^T W_{su}}{\|W_{td}\| \|W_{su}\|}$$

where T denotes the transpose of a vector, $W_{su}$ is a filter coefficient of the first filter and $W_{td}$ is a filter coefficient of the third filter.

15. The method as claimed in claim 13 further comprising treating the signal as an unwanted signal when the reverberation measure indicates a degree of reverberation in excess of a selected value.

16. The method of claim 1, wherein a spectrum of a Fourier transformed signal is calculated, said Fourier transformed signal comprising at least one of a Fourier transform component F(S) of a target signal and Fourier transform component F(I) of an unwanted signal, the method further comprising:

constructing spectrums P(S) and P(I) of at least one equivalent in accordance with the following equations:

$$P(S) = |\mathrm{Real}(F(S))| + |\mathrm{Imag}(F(S))| + G[F(S)] * R(S)$$

$$P(I) = |\mathrm{Real}(F(I))| + |\mathrm{Imag}(F(I))| + G[F(I)] * R(I)$$

where "Real" and "Imag" refer to absolute values of a real part and an imaginary part of the frequency domain equivalents F(S) and F(I), R(S) and R(I) are scalar adjustment factors, and G[F(S)] and G[F(I)] are functions of F(S) and F(I) respectively.

* * * * *